US011092957B1

(12) United States Patent
Chinoy

(10) Patent No.: US 11,092,957 B1
(45) Date of Patent: Aug. 17, 2021

(54) NAVIGATION CONTROLLER SYSTEM AND METHOD FOR RETRIEVING CONTROL OF A REMOTELY CONTROLLED DEVICE

(71) Applicant: Rayomond H. Chinoy, Tampa, FL (US)

(72) Inventor: Rayomond H. Chinoy, Tampa, FL (US)

( * ) Notice: Subject to any disclaimer, the term of this patent is extended or adjusted under 35 U.S.C. 154(b) by 593 days.

(21) Appl. No.: 15/834,746

(22) Filed: Dec. 7, 2017

Related U.S. Application Data

(60) Provisional application No. 62/475,226, filed on Mar. 23, 2017.

(51) Int. Cl.
*G05D 1/00* (2006.01)
*B64C 39/02* (2006.01)
*H04W 4/14* (2009.01)

(52) U.S. Cl.
CPC ......... *G05D 1/0022* (2013.01); *G05D 1/0055* (2013.01); *B64C 39/024* (2013.01); *B64C 2201/146* (2013.01); *H04W 4/14* (2013.01)

(58) Field of Classification Search
None
See application file for complete search history.

(56) References Cited

U.S. PATENT DOCUMENTS

| 8,521,343 | B2 | 8/2013 | Spinelli |
| 8,676,502 | B2 | 3/2014 | Petersen |
| 8,798,922 | B2 | 8/2014 | Tillotson et al. |
| 8,942,922 | B2 | 1/2015 | Wiegand et al. |
| 10,112,700 | B1* | 10/2018 | Birch ................. B64C 25/10 |
| 10,312,994 | B2* | 6/2019 | Priest ................ G08G 5/0039 |
| 2016/0071420 | A1* | 3/2016 | Heilman ............. G07C 5/02 701/120 |
| 2016/0196525 | A1 | 7/2016 | Kantor et al. |
| 2016/0363929 | A1* | 12/2016 | Clark .................. B64F 1/00 |
| 2017/0057634 | A1* | 3/2017 | Hunt ................ G08G 5/0082 |
| 2017/0358215 | A1* | 12/2017 | Priest ................ H04W 84/00 |
| 2017/0372599 | A1* | 12/2017 | Choi ................ G08C 17/02 |
| 2018/0017973 | A1* | 1/2018 | Teague ............. G08G 5/0069 |
| 2018/0026705 | A1* | 1/2018 | Parks ................ H04B 7/18506 701/2 |
| 2018/0130017 | A1* | 5/2018 | Gupte ............... G01N 33/00 |
| 2019/0363821 | A1* | 11/2019 | Whittaker ......... G05D 1/0022 |
| 2019/0384279 | A1* | 12/2019 | Song ............... H04W 36/0022 |
| 2020/0026273 | A1* | 1/2020 | He .................. H04B 7/18506 |

\* cited by examiner

*Primary Examiner* — Ryan Rink
(74) *Attorney, Agent, or Firm* — Glenn E. Gold, P.A.; Glenn E. Gold

(57) ABSTRACT

A navigation controller system and method for retrieving control of a remotely controlled device includes an onboard primary controller supportable on a remotely controlled device and adapted to control operation thereof, a base controller adapted to communicate with the onboard primary controller by a first mode of communications to provide instructions to control and operate the remotely controlled device, and an auxiliary controller module supportable on the remotely controlled device either separately from or integrated into the onboard primary controller and adapted to communicate with the base controller by a second mode of communications not the same as the first mode of communications so that the auxiliary controller module acts as a backup to disable, disconnect or otherwise take over control from the onboard primary controller when it is rendered non-responsive to communications from the base controller.

17 Claims, 6 Drawing Sheets

NAVIGATION CONTROLLER SYSTEM AND METHOD FOR RETRIEVING CONTROL OF A REMOTELY CONTROLLED DEVICE

FIELD OF THE INVENTION

The present invention relates to systems for controlling operation of remotely controlled devices, and, more particularly, is concerned with a navigation controller system and method for retrieving control of a remotely controlled device.

BACKGROUND OF THE INVENTION

As remotely controlled devices, such as flying drones and remotely operated cars become more popular, or frustrating, depending on one's perspective, an influx of gadgets are being utilized to block radio frequency (RF) communication signals and even use methods such as shooting nets and RF jamming guns to obstruct the operations of the remotely controller devices. In some cases, drones are maliciously being hijacked by hijackers impersonating the controller and overwhelming the receiver by sending stronger signals to the device than the original transmitter, so the receiver believes it is still being governed appropriately. Whether the drone is hijacked and or destroyed, many of them are expensive and their loss can be a significant financial strain on their owners, especially, if the drones are used to generate income-related business.

In addition to the foregoing, as the range of modern drones increase, chances are good that at some point, the drones will fly beyond range, run out of power and potentially get lost. With batteries drained, there is often no way to find the crash site. Even if the primary power sources have not drained, the devices may still have traveled out of RF range such that their owners would be unable to recall them.

One prior art approach is presented in U.S. Pat. No. 8,798,922. The patent proposes to supplement the software of the onboard system that normally controls the flight path of the drone so that a preplanned and programmed operation may be carried out in the event of the occurrence of an in-flight contingency. For instance, if a RF receiver of the onboard controller on the drone has failed or its RF signal is garbled by being jammed, and thus cannot regain communication with a remote base controller, a software module or computer program resident in the onboard controller can execute a user-specified preplanned operation to attempt to get the onboard controller back into RF communication with the remote base controller. However, in the case of most hijackings, the onboard controller may be unaware that the system is compromised and is being taken over. If the system doesn't recognize it is compromised or that is original (native) signal is being jammed, it does not proceed with the execution of the user-specified preplanned operation, which results in the loss of the drone.

Accordingly, there is a long felt but, as of yet unmet, need for a navigation controller and system particularly suited for preventing the hijacking of a remotely controlled device and the instant retrieval of said device should the communication between the operator and device be lost.

SUMMARY OF THE INVENTION

The present invention is directed to an innovation providing a navigation controller system and method for retrieving control of a remotely controlled device that overcomes the deficiencies of the known art and the problems that remain unsolved by provision of an auxiliary controller module. The system and method provide an alternate way of sending instructions to a remotely controlled device in order to retrieve control of it once its onboard controller has been compromised. The alternate way of communication is generally more difficult to block and in most instances illegal to do so in comparison to the present ways of communication.

In one aspect of the present invention, a navigation controller system for retrieving control of a remotely controlled device includes:

an onboard primary controller supportable on a remotely controlled device and adapted to control operation of the remotely controlled device;

a base controller adapted to communicate with the onboard primary controller by a first mode of communications to provide instructions by which the onboard primary controller is to control and operate the remotely controlled device; and an auxiliary controller module supportable on the remotely controlled device either separately from or integrated into the onboard primary controller and adapted to communicate with the base controller by a second mode of communications not the same as the first mode of communications between the onboard primary controller and the base controller so that the auxiliary controller module acts as a backup to take over control in place of the onboard primary controller when rendered non-responsive to communications from the base controller.

In another aspect of the present invention, the first mode of communications between the base controller and the onboard primary controller is one of radio frequency signals and cellular signals and the second mode of communications between the base controller and the auxiliary controller module is the other of radio frequency signals and cellular signals.

In another aspect of the present invention, the second mode of communications between the auxiliary controller module and the base controller utilizes a coded short message service messaging embodying a predetermined specific code that activates the auxiliary controller module to disconnect, disable, or take over control from the onboard primary controller in response to receipt of the specific code.

In another aspect of the present invention, an auxiliary controller module includes:

a global system for mobile communications (GSM) module;

a global positioning system (GPS) receiver;

a communications transmitter/receiver; and a processor unit and power supply for enabling operation of the GSM module, GPS receiver and communications transmitter/receiver.

In another aspect of the present invention, the GSM module operates in accordance with a set of GSM standards for receiving a mode of communication utilizing a subscriber identity module (SIM) card and a short message service (SMS) messaging that communicates with and receives a text message.

In another aspect of the present invention, the text message embodies a predetermined specific code, preceded by a predetermined authentication code that activates the auxiliary controller module to take over control from an onboard primary controller in response to receipt of the specific code and authentication code.

In another aspect of the present invention, a method for retrieving control of a remotely controlled device includes:

determining at a base controller that an onboard primary controller on a remotely controlled device is not responding to a first mode of communication between the base controller and onboard primary controller;

sending instructions from the base controller to an auxiliary controller module on the remotely controlled device using a second mode of communications different from the first mode of communications and directing the auxiliary controller module to cut off the onboard primary controller from control of the remotely controlled device and take over control of the remotely controlled device and follow the instructions to take further actions concerning the remotely controlled device; and restoring full control of the remotely controlled device to the onboard primary controller once the first mode of communications between base controller and onboard primary controller are restored.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
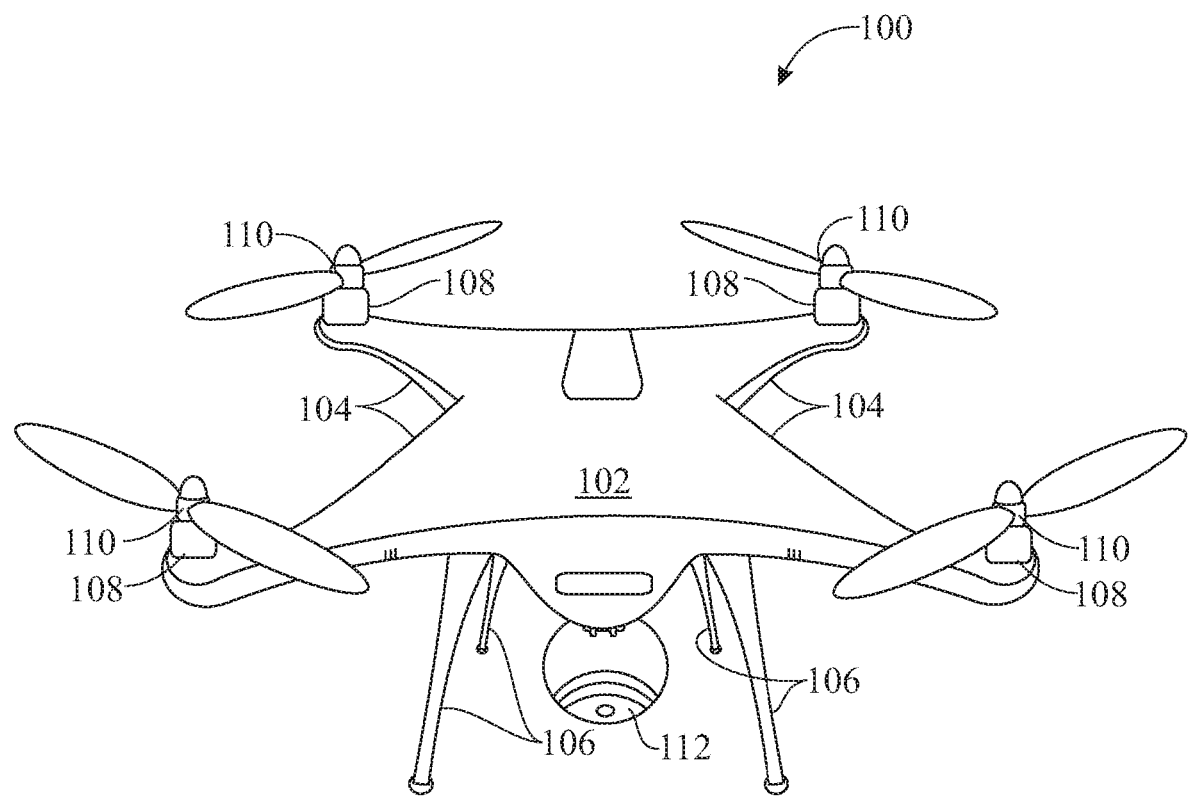
FIG. 1 presents a top front view of a prior art exemplary embodiment of a remotely controlled device, namely an unmanned aerial vehicle (UAV) commonly referred to as a drone.

Referring to FIG. 1, there is illustrated a prior art exemplary embodiment of a remotely controlled device, generally designated 100, in the form of an unmanned aerial vehicle (UAV) commonly known as a drone. It should be understood that the remotely controlled device 100 may be a different form of remotely controlled vehicle, such as an automobile. When in the form of a drone, the remotely controlled device 100 typically includes an airframe body 102 having a plurality of outward projecting rotor arms 104 and a plurality of downward projecting legs 106. The legs 106 support landing the remotely controlled device 100 in an upright horizontal orientation. At their outer ends, the rotor arms 104 mount motors 108 drivingly coupled to rotors 110 disposed above the motors and outer end of the rotor arms. The airframe body 102 also may support a camera 112.

Figure 2:
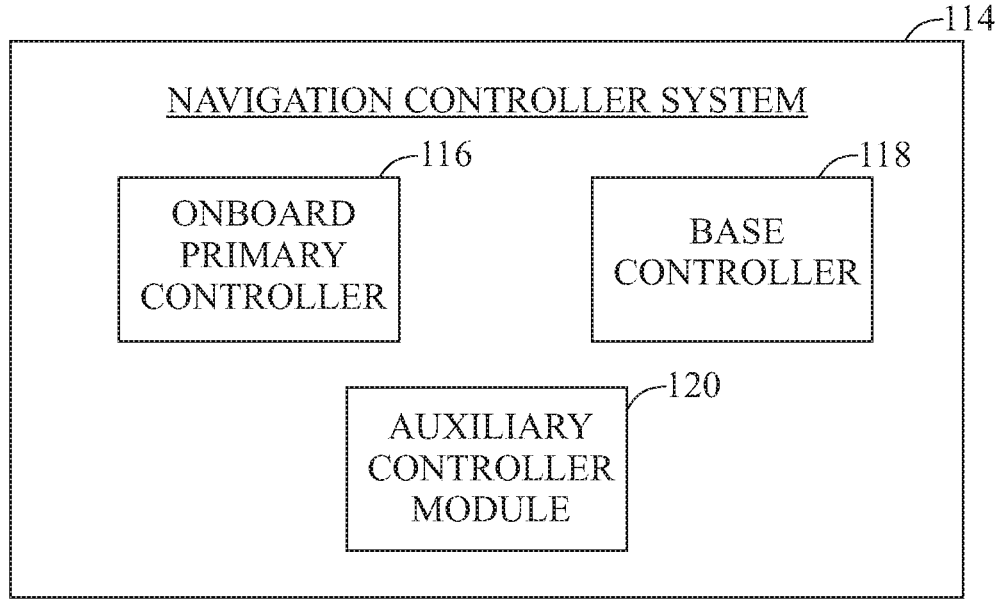
FIG. 2 presents a general block diagram of an exemplary embodiment of a navigation controller system for retrieving control of a remotely controlled device in accordance with aspects of the present invention.

Referring now to FIG. 2, there is illustrated a navigation controller system 114, and the components thereof, for retrieving control of the remotely controlled device 100 in accordance with aspects of the present invention. The navigation controller system 114 generally includes a remote unit in the form of an onboard primary controller 116 that incorporates the components shown in FIG. 3, a base controller 118 that incorporates the components shown in FIG. 4, and an auxiliary controller module 120 that incorporates the components shown in FIG. 5.

Figure 3:
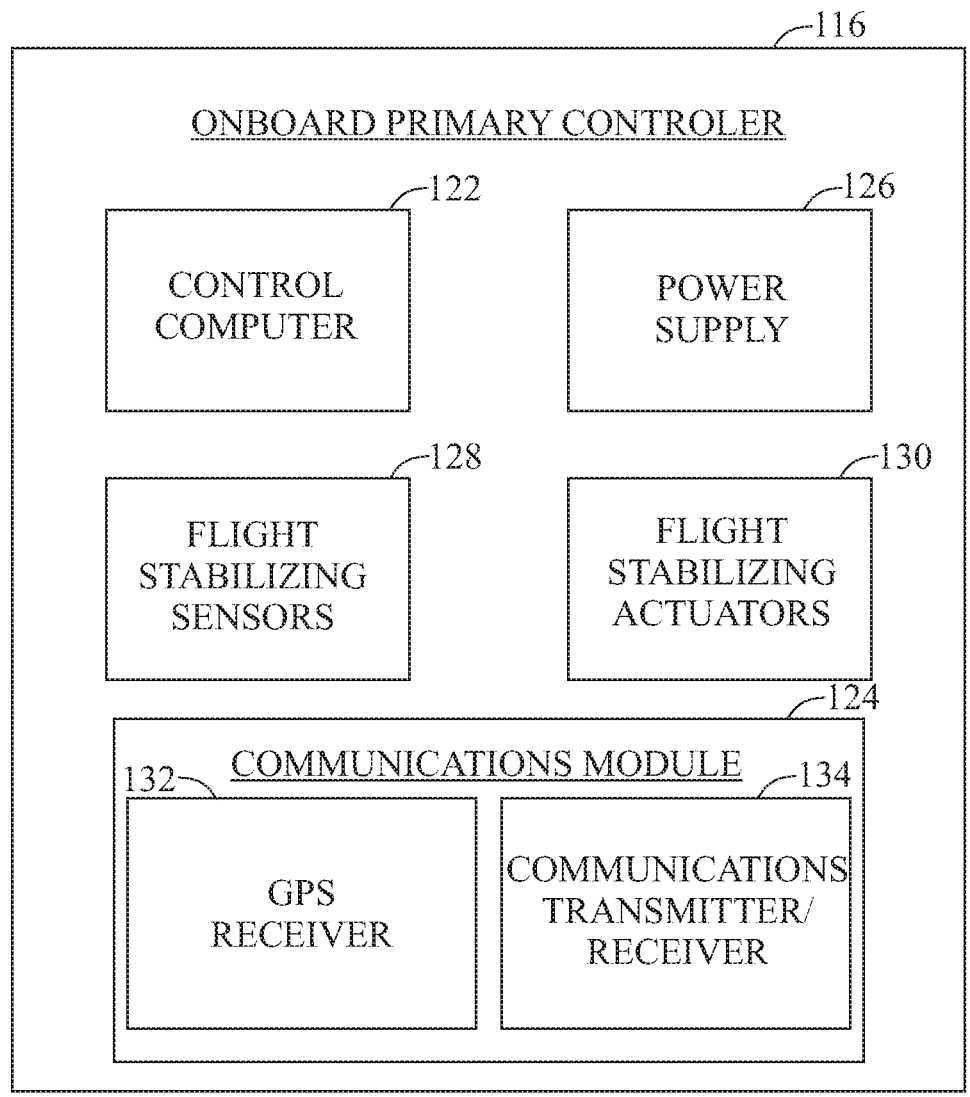
FIG. 3 presents a detailed block diagram of an exemplary embodiment of an onboard primary controller, which may be one of the components of the navigation controller system.

Referring to FIG. 3, there is illustrated the onboard primary controller 116 of the navigation controller system 114. The onboard primary controller 116 is supported on the airframe body 102 of the remotely controlled device 100. The onboard primary controller 116 may include a control computer 122, a communications module 124, a power supply 126, and flight stabilizing sensors 128 and actuators 130. The communications module 124 may include a global positioning system (GPS) receiver 132 for determining coordinates of the location of the remotely controlled device and a communications receiver/transmitter 134 utilizing a predetermined first mode of communications for communicating with the base controller 118. The onboard primary controller 116 is adapted to control, for example, operation of the motors 108, and thus the rotors 110, and also operation of the camera 112, in controlling the operation of the remotely controlled device 100.

Figure 4:
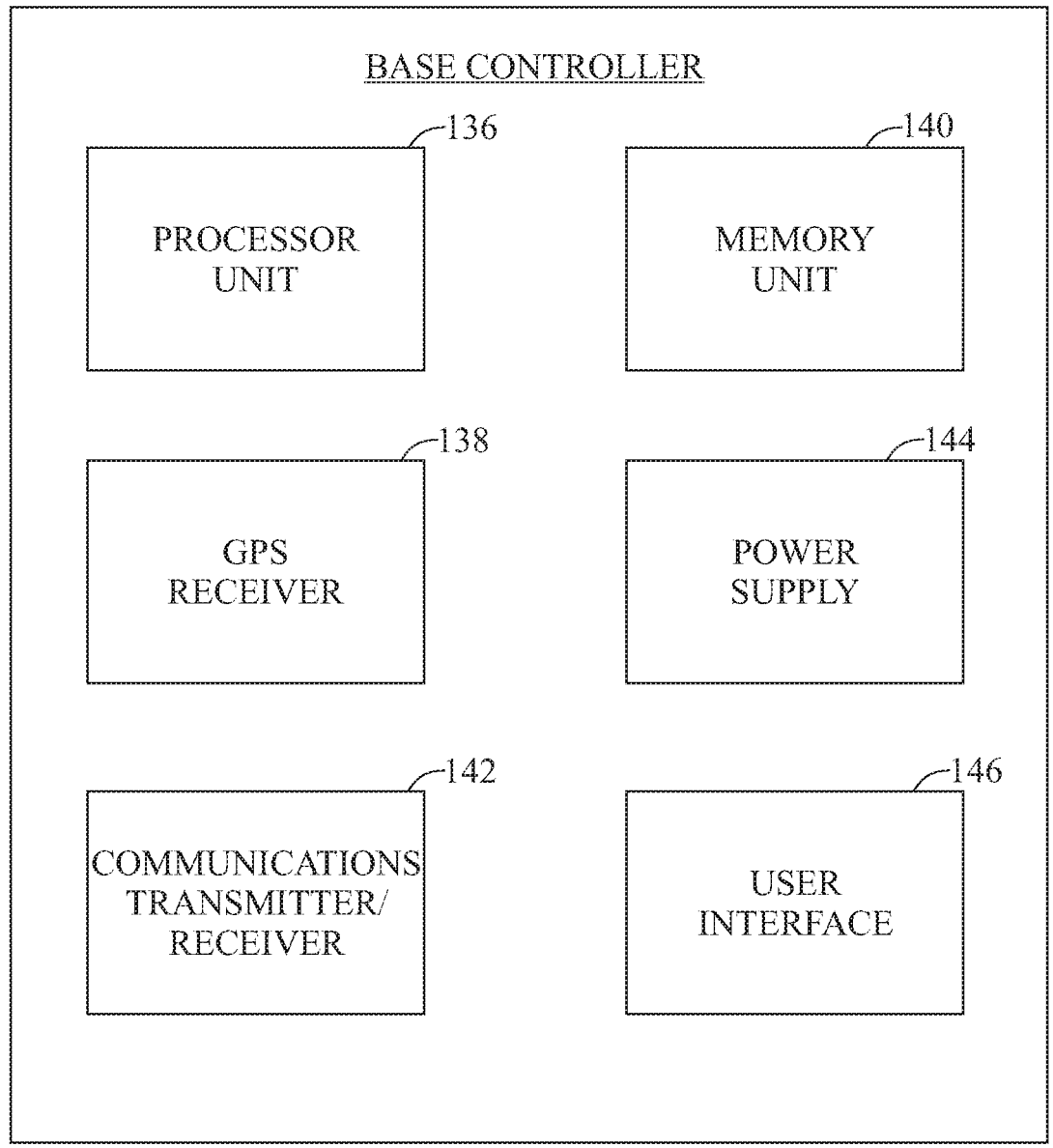
FIG. 4 presents a detailed block diagram of an exemplary embodiment of a base controller, which may be one of the components of the navigation controller system.

Referring now to FIG. 4, there is illustrated the base controller 118 of the navigation controller system 114. The base controller 118 may be portable, typically adapted to be held by or in the possession of a user operator. The base controller 118 may have a processor unit 136, a global positioning system (GPS) receiver 138 for determining coordinates of the location of the base controller, a memory unit 140 connected to the processor unit 136, a communications transmitter/receiver 142 utilizing the predetermined first mode of communications for communicating with the onboard primary controller 116, a power supply 144, and a user interface 146. The base controller 118 may be a portable cellular phone, such as an iPhone® or a Blackberry® mobile device, a laptop computer or other portable electronic device. The predetermined first mode of communications the onboard primary controller 116 and base controller 118 use to communicate with each other may be, for example, RF signals, although alternatively may be Bluetooth, cellular etc., signals, to provide instructions by which to control and operate the remotely controlled device 100. The control operations performed by the onboard primary controller 116 and the base controller 118 are conventionally well-known, such as by way of example presented in the disclosure of U.S. Pat. No. 7,231,294. The disclosure of this patent is hereby incorporated herein by reference thereto.

Figure 5:
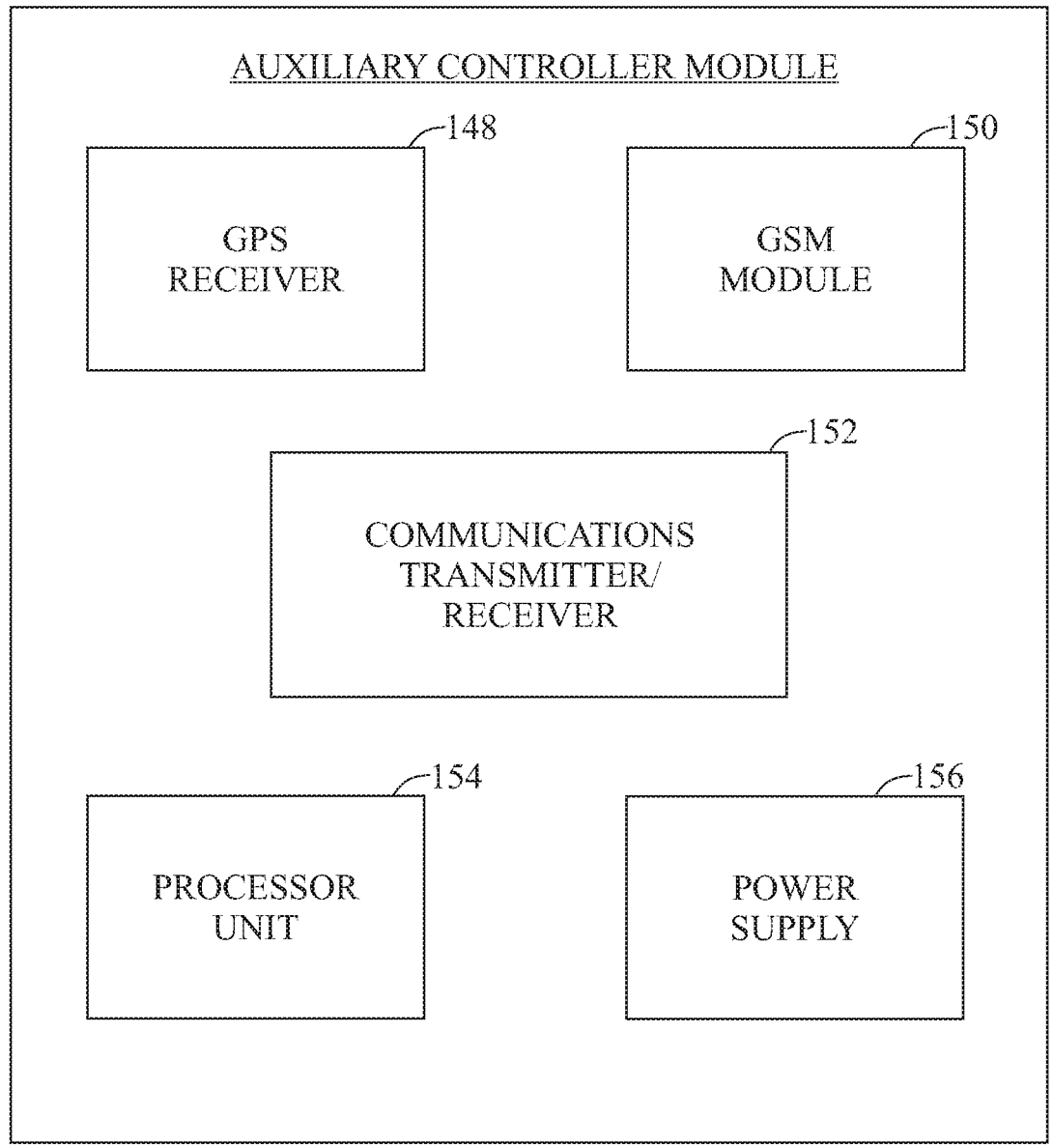
FIG. 5 presents a detailed block diagram of an exemplary embodiment of an auxiliary controller module in accordance with aspects of the present invention, which may be one of the components of the navigation controller system.

Referring to FIG. 5, there is illustrated the auxiliary controller module 120 of the navigation controller system 114, in accordance with aspects of the present invention. The auxiliary controller module 120 may include a GPS receiver 148 for determining coordinates of the location of the auxiliary controller module, a global system for mobile communications (GSM) module 150, a communications transmitter/receiver 152, and a processor unit 154 and a power supply 156 for enabling operation of the communications transmitter/receiver, GPS receiver, and GSM module. As an added safety feature, the power supply 156 equipped on to auxiliary controller module 120 is able to provide power to the aforementioned equipment even when the primary power supply 126 to the onboard primary controller 116 has dwindled. The auxiliary controller module 120 may be either separately retrofitted on the remotely controlled device 100 or integrated into its onboard primary controller 116. The auxiliary controller module 120 operates in accordance with GSM standards. It does not communicate with the base controller 118 using the same mode of communications signals as does the onboard primary controller 116, but by an alternate way in the form of a predetermined second mode of communications to send instructions, such cellular signals as coded short message service (SMS) messaging, or mobile phone call using 3G/4G./LTE systems, from the base controller. It is contemplated that the first and second modes of communications may be reversed such that, for example, communications between the onboard primary controller 116 and base controller 118 may be by cellular signal mode while communications between the base controller 118 and auxiliary controller module 120 may be by RF signal mode.

The portable cellular phone of the base controller 118, via its own GSM module, using a subscriber identity module (SIM) card and employing the short message service (SMS), may communicate with and send a text message embodying a predetermined specific (such as an alphanumeric) code to the GSM module 150 of the auxiliary controller module 120. The auxiliary controller module 120 remains dormant till the authentication code and specific code, known only by the operator of the base controller 118 and by the auxiliary controller module 120 on the remotely controlled device 100, is sent by the base controller to the auxiliary controller module. In the event the operator notices that the ability of the onboard primary controller 116 to communicate via RF signals, for example, with the base controller 118 fails for whatever reason, the auxiliary controller module 120 may be activated by receipt of the specific code communicated via non-RF signals from the operator of the base controller 118 to the auxiliary controller module. The authentication and specific code may be sent merely by a simple push of a button by the operator of the base controller. Thus the auxiliary controller module 120 thus acts as a backup and disconnects, disables or otherwise takes over control in place of the onboard primary controller 116 in response to receipt of the authentication and specific code. Even if the onboard primary controller 116 does not fail, such as when the operator realizes the remotely controlled device 100 is hijacked, lost or otherwise not responding to the primary RF controls, the auxiliary controller module 120 responds to receipt of the authentication and specific code by cutting off further control from the onboard primary controller and forces the remotely controlled device to comply with a new set of pre-programmed, on-the-fly instructions (or commands) in order to safely retrieve the remotely controlled device, or at the very least, send out the location of the device to the operator of the base controller 118.

Figure 6:
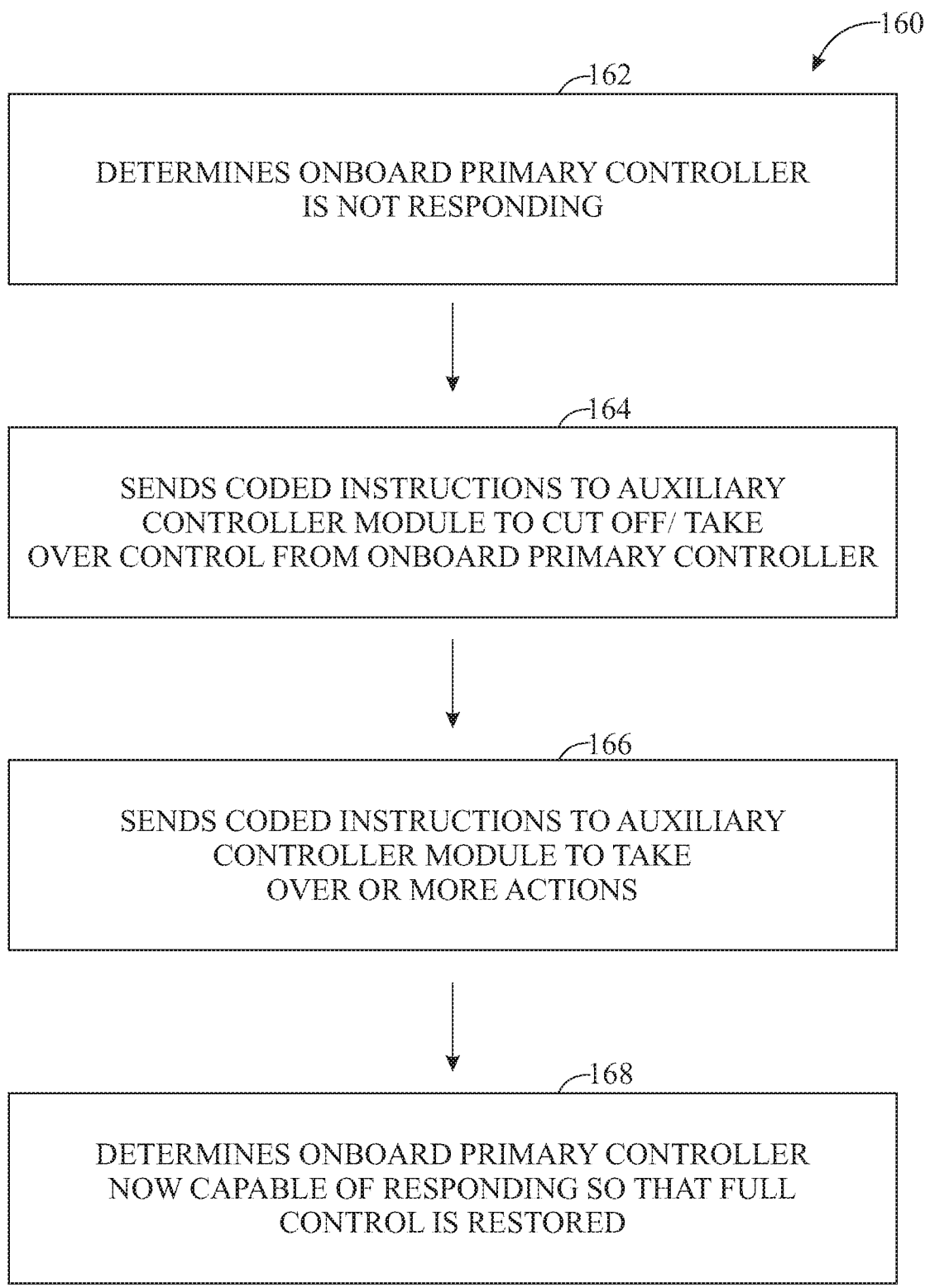
FIG. 6 presents in a flow diagram an exemplary embodiment of a method for retrieving control of a remotely controlled device in accordance with aspects of the present invention.

Referring to FIG. 6, there is illustrated a flow diagram, generally designated 160, of an exemplary embodiment of a method of retrieving control of a remotely controlled device 100 in accordance with aspects of the present invention. As per initial step 162, the operator of the base controller 118 determines that the onboard primary controller 116 is not responding. As per next step 164, the operator directs the base controller 118 to send alternate instructions (or commands) via coded SMS messages that includes an authentication code to the auxiliary controller module 120 on the remotely controlled device 100 to cut off the onboard primary controller 116 and disconnect, disable or otherwise take over control of the remotely controlled device from the onboard primary controller 116. As per next step 166, the instructions (or commands) via the coded SMS messages also indicate one or more of several possible alternative actions that the auxiliary controller module 120 is to take, as follows: (A1) the remotely controlled device 100 is to return to base; (A2) the remotely controlled device 100 is to go to a specific location specified in the coded SMS; (A3) the auxiliary controller module 120 is to send current coordinates of the remotely controlled device 100 to the base controller 118 (and/or to other specified recipients); (A4) the auxiliary controller module 120 is to track the path of the remotely controlled device 100 and send the path information to the base controller 118 (and/or to other specified recipients); (A5) the auxiliary controller module 120 is to provide the coordinates of the current location and/or location history of the remotely controlled device 100 to the base controller 118; and/or (A6) any other command from the base controller (such as in an extreme case, an instruction, or command, that the remotely controlled device 100 self-destruct). As per final step 168, the onboard primary controller 116 may be restored to full control of the remotely controlled device 100 should the operator determine that the onboard primary controller 116 is out of jamming range and now capable of responding and resuming such control. The auxiliary controller module 120 is not intended to be used to control the remotely controlled device 100 full-time; instead, it is specifically designed to be used as a failsafe device when normal control has failed.

The auxiliary controller module 120 may be implemented as a standalone device or an integrated device according to different shapes, sizes and styles desired by users. It is perceived that the dimensions may be as small within the range of about 2.5 cm-5 cm×2.5 cm-4 cm×1 cm. With regard to either standalone or integrated options, end users, either companies or individuals, who are currently or planning to use remotely controlled devices 100 may wish to protect their investment by being able to have an alternative means of communicating with their remotely controlled devices (e.g. a phone app). Also, law enforcement may also find use for the auxiliary controller module 120 to provide the failsafe option as illegal in most jurisdictions to jam or block communication signals. If the remotely controlled device 100 is stolen, or lost, the user who has deployed the auxiliary controller module 120, as heretofore described, may access it via SMS and receive a real-time location or set off a buzzer to alert local authorities. In another implementation, the contingency auxiliary controller module 120 may also be outfitted with an audio output component, such as a auditory device (e.g. a speaker), which can send out various noises like ones that mimic an eagle, etc., to protect the remotely controlled device 100 against an attack by another bird of prey.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A navigation controller system for regaining operator control of a remotely controlled vehicle after operator communication with the remotely controlled vehicle has been lost, the system comprising:
    an onboard primary controller supportable on the remotely controlled vehicle and adapted to control operation of the remotely controlled vehicle;
    a base controller adapted to communicate with said onboard primary controller via a first mode of communication in order to provide instructions by which said onboard primary controller is to control and operate the remotely controlled vehicle; and
    an auxiliary controller module supportable on the remotely controlled vehicle and adapted to communicate with said base controller via a second mode of communication different from the first mode of communication between said onboard primary controller and said base controller, such that said auxiliary controller module functions as a backup to temporarily take over control of the remotely controlled vehicle, in place of said onboard primary controller, when the remotely controlled vehicle is rendered non-responsive to operator-attempted communication from said base controller to said onboard primary controller,
    wherein communication from said base controller to said auxiliary controller module, via said second mode of communication, relies upon a coded messaging scheme requiring communication of a predetermined specific code, from said base controller to said auxiliary controller module, which activates said auxiliary controller module to disable, and take over control from, said onboard primary controller in response to receipt of said predetermined specific code, and wherein said predetermined specific code is known only by the operator of said base controller and by said auxiliary controller module.

2. The system of claim 1 wherein said first mode of communication between said base controller and said onboard primary controller further comprises radio frequency signals.

3. The system of claim 2 wherein said second mode of communication between said base controller and said auxiliary controller module further comprises cellular signals.

4. The system of claim 1 wherein said first mode of communication between said base controller and said onboard primary controller further comprises cellular signals.

5. The system of claim 4 wherein said second mode of communication between said base controller and said auxiliary controller module further comprises radio frequency signals.

6. The system of claim 1 wherein the coded messaging scheme associated with said second mode of communication between said auxiliary controller module and said base controller further comprises a coded short message service messaging scheme employing a predetermined specific code that activates said auxiliary controller module to take over control from said onboard primary controller in response to receipt of said specific code.

7. The system of claim 1 wherein said auxiliary controller module includes a global system for mobile communications (GSM) module.

8. The system of claim 7 wherein said second mode of communication between said auxiliary controller module and said base controller operates in accordance with a set of GSM standards utilizing a subscriber identity module (SIM) card and employing a short message service (SMS) messaging that communicates with said auxiliary controller module, and sends a text message to said auxiliary controller module that incorporates a predetermined authentication code and specific code, which activate said auxiliary controller module to take over control from said onboard primary controller in response to receipt of said authentication code and specific code.

9. A method for regaining operator control of a remotely controlled vehicle after operator communication with the remotely controlled vehicle has been lost, the method comprising steps of:
    providing a navigation controller system including an onboard primary controller supportable on the remotely controlled vehicle and adapted to control operation of the remotely controlled vehicle, a base controller adapted to communicate with the onboard primary controller via a first mode of communication in order to provide instructions by which the onboard primary controller is to control and operate the remotely controlled vehicle, and an auxiliary controller module supportable on the remotely controlled vehicle and adapted to communicate with the base controller via a second mode of communication different from the first mode of communication between the onboard primary controller and the base controller, such that the auxiliary controller module functions as a backup to temporarily take over control of the remotely controlled vehicle, in place of the onboard primary controller, when the remotely controlled vehicle is rendered non-responsive to operator-attempted communication from the base controller to the onboard primary controller;
    determining at the base controller that the onboard primary controller on the remotely controlled vehicle is not responding to the first mode of communication between the base controller and the onboard primary controller;
    communicating encoded instructions from the base controller to the auxiliary controller module on the remotely controlled vehicle, using the second mode of communication, directing the auxiliary controller module to cut off the onboard primary controller from control of the remotely controlled vehicle, to take over control of the remotely controlled vehicle, and to follow the instructions to take further actions concerning the remotely controlled vehicle, wherein said communication of encoded instructions from the base controller to the auxiliary controller module relies upon a coded messaging scheme requiring communication of a predetermined specific code, from the base controller to the auxiliary controller module, and wherein said predetermined specific code is known only by the operator of the base controller and by the auxiliary controller module; and restoring full control of the remotely controlled vehicle to the onboard primary controller once the first mode of communication between the base controller and the onboard primary controller is restored.

10. The method of claim 9 wherein the encoded instructions sent from the base controller to the auxiliary controller module utilize a subscriber identity module (SIM) card and a coded short message service (SMS) messaging embodying a text message with a predetermined specific code that activates the auxiliary controller module to take over control from the onboard primary controller.

11. The method of claim 10 wherein the encoded instructions of further actions to take concerning the remotely controlled vehicle includes directing the remotely controlled vehicle to go to a specific location specified in the coded SMS text message.

12. The method of claim 9 wherein the encoded instructions of further actions to take concerning the remotely controlled vehicle includes directing the remotely controlled vehicle to go to a base location.

13. The method of claim 9 wherein encoded the instructions of further actions to take concerning the remotely controlled vehicle includes directing the auxiliary controller module to send current coordinates of the remotely controlled vehicle to a specified recipient.

14. The method of claim 9 wherein the encoded instructions of further actions to take concerning the remotely controlled vehicle includes directing the auxiliary controller module to track the path of the remotely controlled vehicle and to communicate information vis-à-vis the path to a specified recipient.

15. The method of claim 9 wherein the encoded instructions of further actions to take concerning the remotely controlled vehicle includes directing the auxiliary controller module to provide to a specified recipient at least one of the coordinates of the current location and the location history of the remotely controlled vehicle.

16. The method of claim 9 wherein the encoded instructions of further actions to take concerning the remotely controlled vehicle includes directing the remotely controlled vehicle to self-destruct.

17. The method of claim 9 wherein the first mode of communication is by radio frequency signals and the second mode of communication is by cellular signals.

* * * * *